P. F. STICKER.
Vehicle-Spring.
No. 216,983. Patented July 1, 1879.
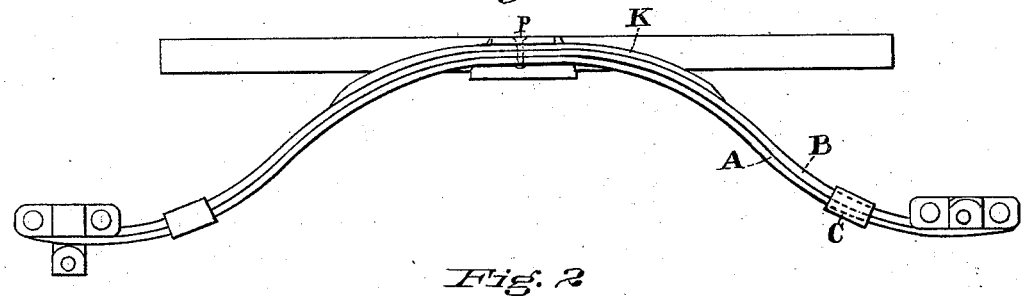
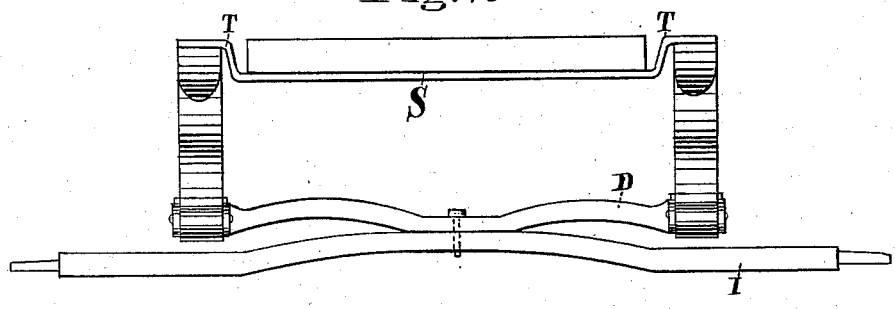
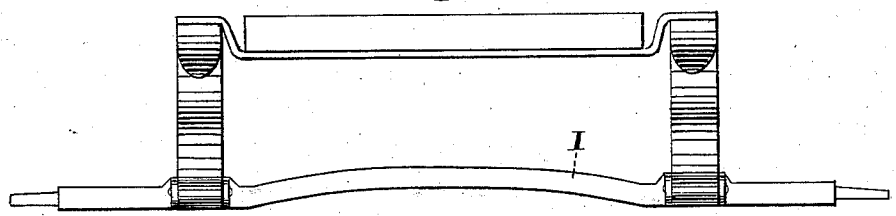
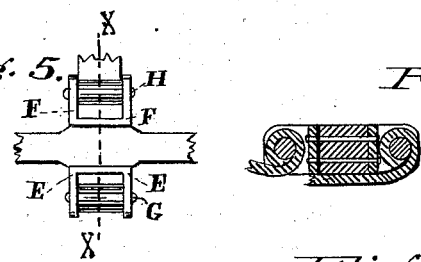
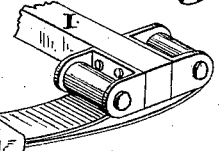
Attest.
Jno. W. Strehli
W. S. Christopher
Inventor.
Peter F. Sticker per
Wm. Hubbell Fisher,
Atty

UNITED STATES PATENT OFFICE.

PETER F. STICKER, OF CINCINNATI, OHIO, ASSIGNOR TO EMERSON, FISHER & CO., OF SAME PLACE.

IMPROVEMENT IN VEHICLE-SPRINGS.

Specification forming part of Letters Patent No. 216,983, dated July 1, 1879; application filed April 23, 1878.

*To all whom it may concern:*

Be it known that I, PETER F. STICKER, of Cincinnati, Ohio, have invented certain new and useful Improvements in Vehicle-Springs and the mode of attachment thereof to vehicles, of which the following is a specification.

My invention relates to that class of vehicle-springs that extend from front to rear of vehicles; and consists in curling the ends of the two lower leaves of the spring, one on the inside and the other on the outside of the head-block and rear axle, and attaching them thereto in such a manner as to prevent the axle from rolling at the same time that the springs themselves act as reaches.

In the accompanying drawings, Figure 1 is a side elevation of one of my springs attached to the head-block and rear axle, and carrying a vehicle-bed. Fig. 2 is a front view of an axle, head-block, and bed provided with my springs. Fig. 3 is a back view of an axle and bed provided with my springs. Fig. 4 is a section through the line $x\ x$ of Fig. 5 of my spring and axle on head-block at the point of attachment, showing the peculiar method of attachment of the spring to the said head-block and axle. Fig. 5 is a top view of parts shown in Fig. 4. Fig. 6 is a perspective view of the parts shown in Figs. 4 and 5.

The spring, as shown, consists of three leaves, A, B, and K, A and B being the main leaves of the spring, and K being a short strengthening and protecting leaf placed at the center of the curve of the principal leaves. This leaf K is not essential to the invention, and may be omitted when desired, or the number of these leaves may be increased at will.

I is the rear axle, and D is the head-block. The spring is attached at the front to the head-block and at the rear directly to the axle. The front axle, being attached to the fifth wheel and swinging with it, necessitates the intervention of a head-block for the attachment of the springs. The two lower leaves of the spring are grasped and held together by the clasps C.

The bed or body of the vehicle is attached to the springs at or near the center of the curve of the spring in any convenient manner. It is here attached thereto as follows:

The bed rests upon and is secured to a broad brace, S, the ends of the latter resting upon and rigidly secured to the top of the spring by means of a rivet, P. The brace S is preferably bent at T and T', as shown, so as to allow the bed of the vehicle to be lowered.

For attaching the leaves of the spring to the head-block and rear axle, the latter are each provided at a proper distance from the ends with horizontally-projecting ears F F and E E, as shown in Fig. 5. Rivet H connects ears F F, and rivet G connects ears E E.

The leaf A is curled around rivet G, and leaf B is curled around rivet H, as shown in Fig. 4. These leaves A and B work loosely around rivets G and H.

If desired, leaf B may be extended over the head-block and rear axle, and leaf $a$ attached to the inside of the head-block and axle, the curls being made downward instead of upward around the rivets, without interfering with the nature of my invention, which has for its main feature the attachment of these two main leaves, one to the inside and the other to the outside of the head-block and rear axle.

When the invention is applied to heavy vehicles the springs are attached to the bolsters or bolster and rear axle.

Attaching the springs to the head-block and rear axle in this way prevents the axle from rolling, and obviates the necessity of the employment of reaches. Thus a single spring on each side of the body not only performs the office of a spring, but also acts as the reach.

This spring not only dispenses with reaches, but also with connecting-rod, and, besides, renders the vehicle extremely easy for riding purposes. It can be quickly, easily, and securely attached to the body and to the head-block and rear axle. It admits of easy repair or readjustment, and greatly lessens the cost of making spring-vehicles.

My device presents advantages over others which employ two springs at the side, both in economy in construction and practicability for use. Devices have been used in which two or more leaves have been used on each side of the body, the main leaves being attached above and below the axle, and separated from each other. This construction will not prevent the axle rolling, because the lower spring or leaf is of necessity the longer of the two, and the springs being fastened in a vertical line the equal depression of the two springs will cause the lower spring or leaf to extend more than the upper and cause the axle to roll.

My device allows the main leaves of the spring to be in juxtaposition everywhere, (except, of course, where one of them passes beneath the axle,) and the one leaf to receive support from the other.

I claim as my invention and desire to secure by Letters Patent—

1. The combination of the leaves A B, held in juxtaposition by the clamps C, and attached to the front and rear sides of the axles or bolster and axle, substantially as specified.

2. A vehicle-spring having two main leaves, A B, held in juxtaposition, the upper leaf, A, being connected to the back of the head-block and the front of the rear axle, and the lower leaf, B, passing under the head-block and rear axle, and connected to the front of the head-block and the back of the rear axle, substantially as and for the purposes specified.

PETER F. STICKER.

Attest:
J. A. MACKEY,
C. WALTON, Jr.